March 25, 1941.    J. H. S. SKONING    2,235,906
APPARATUS FOR MOLDING
Filed May 7, 1936
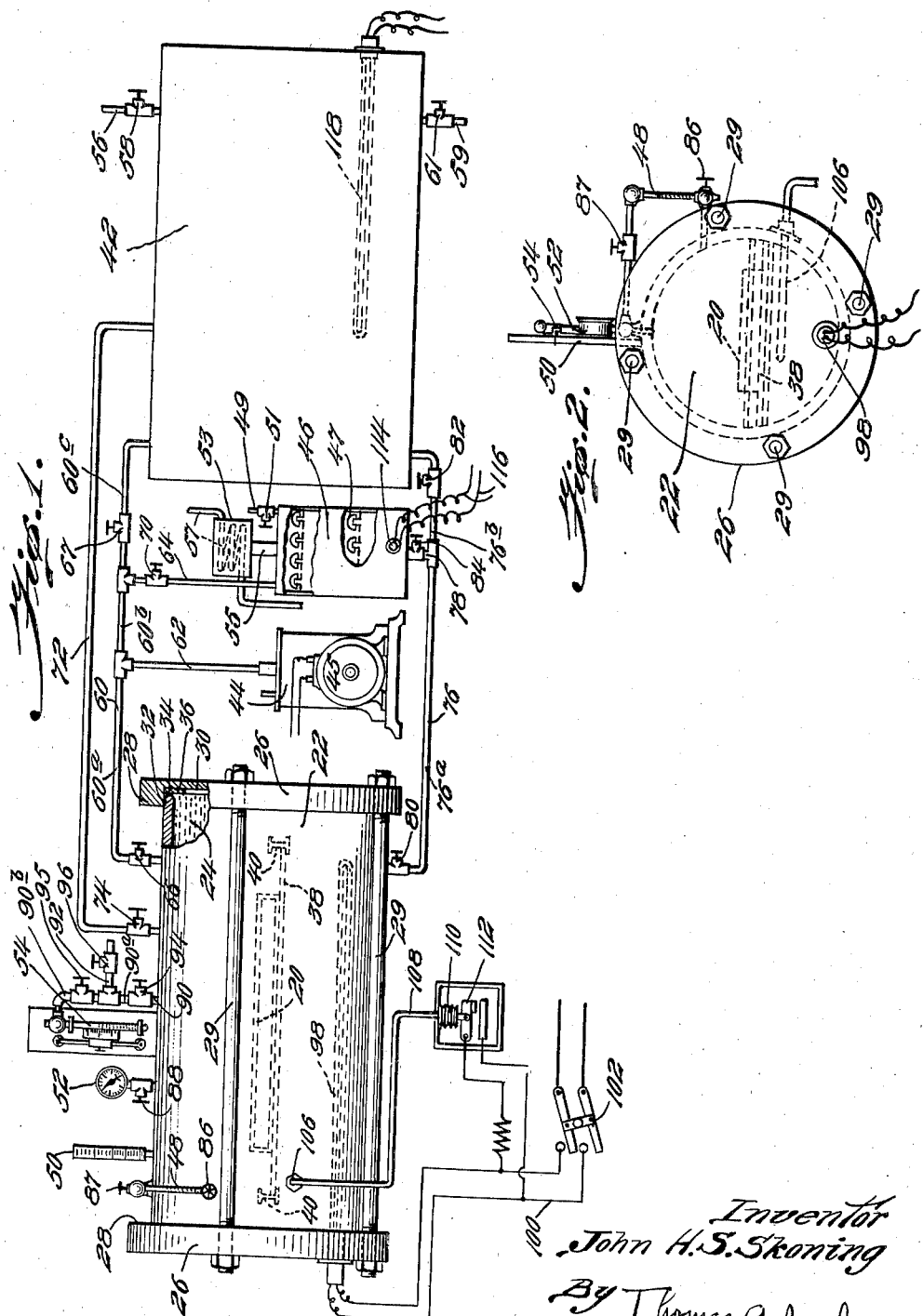
Inventor
John H. S. Skoning
By Thomas A. Jenkes
Attorney Patented Mar. 25, 1941

2,235,906

UNITED STATES PATENT OFFICE 2,235,906

APPARATUS FOR MOLDING

John H. S. Skoning, East Providence, R. I., assignor, by direct and mesne assignments, to Skoning Corporation, Providence, R. I., a corporation of Rhode Island Application May 7, 1936, Serial No. 78,419

2 Claims. (Cl. 18—6)

This invention relates to an improved apparatus for treating plastic materials utilizing the improved method described in copending application Serial No. 340,924 filed June 17, 1940. The novel apparatus comprising the subject matter of the invention is of a special type so designed as to apply heat and pressure in substantially equal intensities on all surfaces of a resin coated or impregnated article or other plastic body so as to modify the physical characteristics of that body.

An object of the invention is to provide a novel apparatus for applying heat and pressure for plasticizing, polymerizing or other physicochemically modifying a plastic coated or impregnated body. As will be observed more particularly hereinafter, the apparatus insures the application of dynamically balanced temperature and pressure applied to all exposed surfaces of an article. The apparatus further insures an effective penetration of a body to be treated with a coating or impregnating material such as factitious plastics, thermosetting and thermo-plastic resinoids and the like. As will be seen hereinafter, the invention insures marked economies in installation and operative cost in that it insures a re-use of the heat and pressure transmitting medium which is employed to modify the characteristics of the articles treated.

In order to enable a more ready comprehension of the fundamental principles of the invention, a preferred type of apparatus is shown. It is to be understood that this is given didactically to show the principles involved and not as the exclusive means by which these principles may be effectuated.

In the drawing Figure 1 is a diagrammatic side elevation (with parts shown in section) of the improved apparatus. Figure 2 is an elevation of the apparatus shown in Figure 1.

While any suitable type of apparatus may be employed for carrying out my improved method, Figs. 1 and 2 illustrate an improved apparatus I have designed for the purpose of carrying out my improved method to apply heat and pressure in equal intensities on all exposed surfaces of an article. Said apparatus includes a sealed high pressure container forming the confined space 22. In the apparatus shown, the container comprises a large tube provided with the end caps 26 having flanges 28 protruding radially of the tube, joined together at circumferential intervals thereof by the bars 29. Particularly in polymerizing objects where it is desirable that relatively high pressures be employed and it is also desirable that one cap 26 be removed from one end thereof so that the articles 20 to be treated therein can be readily inserted and renewed and the container 22 suitably sealed, for these purposes I have provided each cap with a central counter-sink 30 having the internally threaded shoulder 32 on the edge thereof to mesh with threads on the outer periphery of the end of the container 22, each edge of the container 22 preferably being formed into an annular rim 34 to abut against a suitable packing washer 36 on the interior of the cap adjacent the threaded surface. I also provide means 38 to support the articles 20 within the interior of the container 22 spaced from the walls thereof and in my preferred embodiment said means comprises the shelf 38 suitably mounted on supports 40 attached to the interior of the container 22. I also provide a normally closed reservoir 42 for storing the immersion liquid 24 of whatever type used and the vacuum pump 44 for the purposes to be described. In order to remove impurities from the immersion liquid 24 I also provide a fractionating still 46. To give indications of the progress of my improved method within the container 22, I provide a series of gauges and attachments therefor, which include the liquid column gauge 48, the thermometer 50, the pressure gauge 52, and the vacuum gauge 54, all provided with suitable connecting valves. I also provide suitable means to connect the sealed container 22 to its various indicating instruments heretofore mentioned and to the vacuum pump 44, fractionating still 46, if employed and storage reservoir 42 and I have shown in the drawing an improved type of pipe hook-up for this purpose employing a relatively small number of pipes which may be successfully used for different purposes and including a minimum number of valves. I provide the storage reservoirs 42 with the inlet pipe 56 provided with the valve 58 and I provide said storage reservoir with the outlet pipe 59 provided with the valve 61 therein and the storage reservoir 42 may be suitably charged through the pipe 56, after opening the valve 58, with a suitable immersion liquid 24, comprising when a synthetic resin is desired to be polymerized therein a suitable hydrocarbon compound of the paraffin series or other material varying in accordance with the nature of the objects to be treated or polymerized. The cap 26 may then be conveniently removed from the container and the articles 20, later to be treated laid on the shelf 38 within the container, the articles 20 being preferably preformed in shape, impregnated, coated or otherwise as hereinafter explained of or with suitable plasticizable material prior to being placed in the container 22. The valves of all pipes adjacent the container 22 are first shut and as explained hitherto the first step in my method may include exhausting the container 22 to a substantial vacuum to remove substantially all fluid therefrom, whether it be in the form of liquid, moisture, gas, or otherwise, which would tend to cause impurities in the molded articles. A pipe 60 connects the upper ends of the sealed container 22 and storage tank 42 and is provided centrally thereof with a pipe 62 leading to the vacuum pump 44, and a pipe 64 leading to the upper end of the fractionating still 46. A valve 66 is provided in the portion of the pipe 60ª between the storage reservoir and the connection of the pipe 64 thereto, and another valve 67 is provided in the portion of the pipe 60ᶜ between the storage reservoir 42 and the connection of the pipe 64 thereto, the portion of the pipe 60 between the vacuum pipe 62 and fractionating still pipe 64 being labeled 60ᵇ. A shut off valve 70 is provided in the pipe 64. A supplemental pipe 72 also connects the upper ends of the sealed container 22 and storage reservoir 42 and is provided in the portion thereof adjacent the container 22 with the shut off valve 74 therein which may if desired be a safety valve. Another pipe 76 connects the lower portion of the sealed container 22 with the lower portion of the storage reservoir 42 and is provided with a pipe 78 medially thereof, discharging therein from the lower portion of the fractionating still 46. A valve 80 is provided in the portion of said pipe 76ª between the sealed container 22 and pipe 78, a valve 82 is provided in the portion 76ᵇ of the pipe between the pipe 78 and the storage reservoir 42 and a valve 84 is provided in the pipe 78. The vacuum pump 44 is provided with a suitable electric motor 45 for driving it and the fractionating still 46 is provided with the usual type of rows of inverted bells 47, the discharge pipe 49 leading to atmosphere having a valve 51 therein and the condensing chamber 53 connected to the top thereof by the pipe 55 and having the cooling coil 57 therein. Shut off valves 86 and 87 are provided for the liquid column gauge 48, a shut off valve 88 is provided for the pressure gauge 52 and the vacuum gauge 54 is connected to the container 22 by the pipe 90 having an atmosphere discharge pipe 92 connected thereto. A valve 94 is connected in the portion of the pipe 90ª between the pipe 92 and container 22, a valve 95 is connected in the portion of the pipe 90ᵇ between the pipe 92 and vacuum gauge 54 and a valve 96 is provided in the atmosphere pipe 92.

I provide means to operatively connect the sealed container 22 and vacuum pump 44 to exhaust said container 22 to a substantial vacuum to remove substantially all fluid from said container 22 and articles 20 contained therein, in my preferred embodiment said means comprising the pipe 62 and pipe portion 60ª and for this purpose the valve 66 is opened and the valves 94 and 95 in the pipe sections 90ª and 90ᵇ leading to the vacuum gauge 54 opened and the motor 45 started to cause the vacuum pump 44 to exhaust all fluid from the container 22, the degree of vacuum being indicated by the vacuum gauge 54. If desired to prevent dilution or pollution of the oil in the vacuum pump, an oil trap or condenser may be inserted in the pipe portion 60ª. The vacuum is maintained for a sufficient period to insure the exhaustion of moisture and vapor present in the articles 20 as well as within the container 22 and from the matrix as well as the plastic material of the articles 20. When the desired vacuum has been attained the pump 44 is stopped and the valve 94 in the pipe 90ª leading to the vacuum gauge 54 and the valve 66 in the pipe portion 60ª closed.

Means are then provided to open said storage reservoir 42 to atmospheric pressure which include the valve 58 in the pipe 56 and to operatively connect said reservoir 42 with said exhausted sealed container 22 to permit flow of immersion liquid 24 to substantially fill said sealed container 22. For this purpose the valves 86 and 87 leading to the liquid column gauge 48 are opened to indicate the level of immersion liquid 24 within the sealed container 22, the valves 82 and 80 in the pipe portions 76ᵇ and 76ª of the pipe are opened and the valve 88 leading to the pressure gauge 52 is opened, the valves 94 and 95 in the pipe portions 90ª and 90ᵇ are closed, the valve 96 in the atmosphere discharge pipe 92 from the container is closed and immersion liquid 24 then flows by gravity and atmospheric pressure entering the reservoir 42, through the then open pipe 76 to fill up the sealed container 22. If desired to remove the last traces of gases from the sealed container 22, the valve 66 may be temporarily opened and the vacuum pump 44 temporarily started to remove said gases through the pipe portion 60ª and pipe 62, and the gauge 48 may then indicate the liquid level in the sealed container 22.

I provide means to apply heat to the immersion liquid 24 within said container 22 to heat said immersion liquid 24 and articles 20 and by the thermo-expansion of said immersion liquid 24 apply substantially equal amounts of pressure to all exposed surfaces of said articles, said means comprising the electric heating element or means 98 projecting within the tank, current being supplied thereto by the circuit 100 provided with the switch 102 therein.

I also provide thermo-statically controlled means to maintain a set temperature within said sealed container 22, in my preferred embodiment comprising a thermostat 106 within the container suitably connected by the thermostatic antenna 108 to the bellows 110 for automatically opening and closing the switch 112 to alternately make and break the circuit 100 to maintain the desired set temperature within the sealed container 22.

When the sealed container has been filled with the immersion liquid 24 completely immersing the articles 20 therein, the valves 80 and 82 in the pipe portions 76ª and 76ᵇ of the pipe 76 are closed and the valves 86 and 87 leading to the liquid level gauge also closed, the switch 102 is then closed to cause current to pass through the circuit 100 to heat the electric heating element 98 and the thermostatic control 106, 108, 110, 112 is put into operation. Heat from the heating element 98 heats the immersion liquid 24 in the container 22 and as the temperature thereof rises heat is transmitted to the articles 20 through the immersion liquid 24 and by the thermal expansion of said immersion liquid equal amounts of pressure are applied to all interior and exterior surfaces of said articles to provide a liquid mold which may in some instances temporarily become gaseous, though being confined may stay liquid even above the boiling point of the immersion liquid, capable of applying equal amounts of pressure on the inside and outside of the articles to prevent buckling, compression, or distortion of the articles being treated, this being of extreme importance when a hollow plastic article is being polymerized or molded. The temperature is indicated by the thermometer 50 and it is apparent that the temperature of the liquid can be regulated by proper manipuluation of the thermostatic control means, for the current transmitted to the heater 98 to maintain it constant. The valve 88 leading to the pressure gauge 52 is opened and as the pressure from the immersion liquid within the container 22 rises, it is readily indicated on the pressure gauge 52. The pipe line 72 with its valve 74 therein forms a pressure relief line and valve and pressure for any given temperature of the liquid can be regulated by the manipulation of this valve. If desired the pressure relief valve 74 may be made automatic instead of manual as shown. Since liquid pressure in a closed container is exerted with equal intensities in all directions, the liquid acts as a mold or surface plate, the heat and pressure causing plasticization of the plastic material where employed and where a polymerizable synthetic resin is employed causes it first to fuse and then to bond together and to bind all the fibres of the matrix together if employed and to the synthetic resin and the plastic or synthetic resin to its adjacent cellular or other surfaces where a matrix or other base be employed. After a period of time, the mass is solidified into a hard composite, under this heat and pressure, and in the case of laminated material the various laminations lose their identity. When the desired polymerization or plasticization has taken place, the circuit 100 is broken by the switch 102 to turn off the heat from the heating element 98 and the valve 84 in the pipe 78 and valve 80 in the pipe portion 76ᵃ opened, the valve 70 in the pipe section 64 opened, the valves 66 and 67 in the pipe sections 60ᵃ and 60ᶜ closed, the valve 51 in pipe 49 closed, the valve 94 in the pipe section 90ᵃ opened and the valve 96 in the atmospheric exhaust pipe 92 opened to permit the influx of atmospheric pressure to the top of the sealed container 22, and the electric motor 45 is started to start the vacuum pump 44 to form a partial vacuum in the fractionating still 46, to permit atmospheric pressure admitted to the top of the sealed container to cause a flow of immersion liquid 24 therefrom to the vacuum still 46 to thus provide means to operatively connect said sealed container 22 to said fractionating still 46. The valves 84 and 80 in the pipe sections 78 and 76ᵃ are then suitably closed, and the cap 26 may be conveniently removed from the sealed container 22 and the then plasticized or polymerized or otherwise treated articles 20 removed from the sealed container 22.

Means are provided to heat said fractionating still 46 to distill in partial vacuum the impurities from said immersion liquid, in my preferred embodiment comprising the electrical heating element 114 within said still 46 suitably heated by the electric circuit 116. It is thus obvious that the volatile fractions will be distilled upwards through the bubble plates 47 in the fractionating still 46 and exhausted to atmosphere from a suitable hole in the container 53, the cooling coil 57, however, being so regulated as to condense and return liquid to the fractioning still 46. After the immersion liquid 24 has had its impurities suitably distilled therefrom, as just explained, the valve 84 in the pipe 78 is opened, the valve 82 in pipe portion 76ᵇ is opened, the valve 70 in pipe portion 64 is closed, the valve 67 in pipe portion 60ᶜ is closed, the valve 58 in inlet pipe 56 to the reservoir 42 is closed, the valve 61 in exhaust pipe 59 from the still 46 is opened, and the electric motor 45 started to again start the vacuum pump to exhaust pressure from the storage reservoir 42 to provide means to operatively connect said fractionating still 46 to said storage reservoir 42 and to atmosphere and said storage reservoir 42 to said vacuum pump 44 to maintain sufficient vacuum within said storage reservoir 42 to permit by atmospheric pressure flow of purified immersion liquid from said fractionating still 46 to said storage reservoir 42 and the apparatus is ready for its next cycle.

When an immersion liquid is employed that has the consistency of a solid at room temperature the heating unit 118 within the reservoir 42 is employed to raise the temperature of the immersion liquid so as to render it in a liquid state prior to starting the cycle.

While I have shown in the drawing a preferred system of pipe and valve connections employing portions of the same pipes for different purposes, it is obvious that if desired entirely independent pipes with appropriate valves for connecting various parts thereof may be provided and that other means than the combination of vacuum and atmospheric pressure shown may be employed to transfer the immersion liquid from one container to another. If desired the vacuum pump may be omitted entirely, in which case its various connecting valves may be suitably changed for other valves and means for this purpose. If desired the fractionating still may be omitted including its various connecting pipes and their respective valves, or if desired both the fractionating still and vacuum pump with their connecting parts may be omitted, other means being provided for the transfer of liquid to and from the sealed container.

As stated hitherto, by employing my improved apparatus, I am enabled to apply sufficient heat and pressure to mold and plasticize objects of large size or irregular shape in a novel and relatively inexpensive manner and I am enabled to cut down the time formerly thought necessary in applying the heat and pressure for this purpose particularly in the case of synthetic resins and I am enabled to eliminate the expensive cost of dies or molds for molding the articles to be polymerized and to permit the use of synthetic resins and like preferably thermo plastic or thermo setting plastics in instances where the cost of molds have hitherto been prohibitive, such as in making structural material for buildings or aeroplanes or polymerizing articles of irregular shape without any individual mold or die costs in any quantity from one up, the actual molding cost not varying whether a thousand articles of a single shape or a thousand articles each of different shape be produced.

It will now be apparent that I have provided a noval apparatus for applying heat and pressure in substantially equal intensities to all exposed surfaces of an article to be treated and that the apparatus is particularly suitable for use in the manufacture of articles of different designs and shapes which hitherto were difficult or impossible to mold by conventional methods.

It will be understood that the invention is not limited to the specific embodiments sought and that various modifications may be made therein without departing from the spirit and scope of the appended claims.

What I claim is:

1. An apparatus for use in applying heat and pressure in equal intensities on all exposed surfaces of an article to provide a smooth even finish on the surface of said article, comprising a sealed high pressure container, a reservoir for storing immersion liquid, a vacuum pump having a suction portion, means to operatively connect said sealed container and said suction portion of said vacuum pump to exhaust said container to a substantial vacuum to remove substantially all fluid from said container and article, means to open said reservoir to atmospheric pressure and to operatively connect said reservoir with said exhausted sealed container to permit by atmospheric pressure flow of immersion liquid to substantially fill said sealed container, means to apply heat to the immersion liquid within said container to heat said immersion liquid and article and by the thermal expansion of said immersion liquid apply substantially equal amounts of pressure to all exposed surfaces of said article, thermostatically controlled means to maintain a set temperature within said sealed container, means to open said sealed container to atmospheric pressure and to operatively connect said storage reservoir to said suction portion of said vacuum pump to maintain a sufficient vacuum within said storage reservoir to permit by atmospheric pressure flow of purified immersion liquid from said container to said storage reservoir.

2. An apparatus for use in applying heat and pressure in equal intensities on all exposed surfaces of an article to provide a smooth even finish on the surface of said article, comprising a sealed high pressure container, a reservoir for storing immersion liquid, a vacuum pump having a suction portion, means to operatively connect said sealed container and said suction portion of said vacuum pump to exhaust said container to a substantial vacuum to remove substantially all fluid from said container and article, means to open said reservoir to atmospheric pressure and to operatively connect said reservoir with said exhausted sealed container to permit by atmospheric pressure flow of immersion liquid to substantially fill said sealed container, means to apply heat to the immersion liquid within said container to heat said immersion liquid and article and by the thermal expansion of said immersion liquid apply substantially equal amounts of pressure to all exposed surfaces of said article, means to open said sealed container to atmospheric pressure and to operatively connect said storage reservoir to said suction portion of said vacuum pump to maintain a sufficient vacuum within said storage reservoir to permit by atmospheric pressure flow of purified immersion liquid from said container to said storage reservoir.

JOHN H. S. SKONING.